United States Patent [19]

Nishikawa

[11] Patent Number: 4,656,402
[45] Date of Patent: Apr. 7, 1987

[54] ELECTRIC MOTOR CONTROL APPARATUS

[75] Inventor: Takayoshi Nishikawa, Chiryu, Japan

[73] Assignee: Nippondenso Co., Ltd., Kariys, Japan

[21] Appl. No.: 827,722

[22] Filed: Feb. 10, 1986

[30] Foreign Application Priority Data

Feb. 13, 1985 [JP] Japan .................................. 60-25499

[51] Int. Cl.$^4$ ............................................. H02P 5/16
[52] U.S. Cl. ..................................... 318/341; 318/317
[58] Field of Search .................. 318/317, 341, 345 E, 318/308, 599

[56] References Cited

U.S. PATENT DOCUMENTS

| 3,911,341 | 10/1975 | Carlson et al. | 318/341 |
| 4,037,145 | 7/1977 | Bailey et al. | 318/341 |
| 4,074,175 | 2/1978 | Born et al. | 318/317 X |
| 4,389,602 | 6/1983 | Post | 318/341 |
| 4,500,830 | 2/1985 | Gotou et al. | 318/341 |

FOREIGN PATENT DOCUMENTS 58-58893  4/1983  Japan .

Primary Examiner—Benjamin Dobeck
Attorney, Agent, or Firm—Cushman, Darby & Cushman

[57] ABSTRACT

In the present invention, in an electric motor control apparatus wherein a load current modulated in a pulse form and flowing in an electric motor is detected, and the load current is controlled by varying a pulse width of the load current so that an average value of the load current follows a command value, the electric control apparatus includes switching means for modulating a direct current supplied to the electric motor from a DC power supply to form the load current, a current detector for detecting the load current flowing in the electric motor, an average load current detecting means for detecting the average value of the load current by inputting from the current detector a load current at a time point after the switching means is rendered conductive and after the lapse of a predetermined time which varies in accordance with an "on" time of the switching means, and by assuming the inputted load current as the average value of the load current to be detected, an "on" time calculating means for determining the "on" time of the switching means in the next period based on the average value of the load current detected by the average load current detecting means and the command value, and a switching control section for on-off controlling the switching means in accordance with a commanded period and the "on" time calculated by the "on" time calculating means.

10 Claims, 10 Drawing Figures

FIG. I (a) MAIN ROUTINE (b) CONTROL PERIOD INTERRUPTION ROUTINE (c) CURRENT DETECTION INTERRUPTION ROUTINE

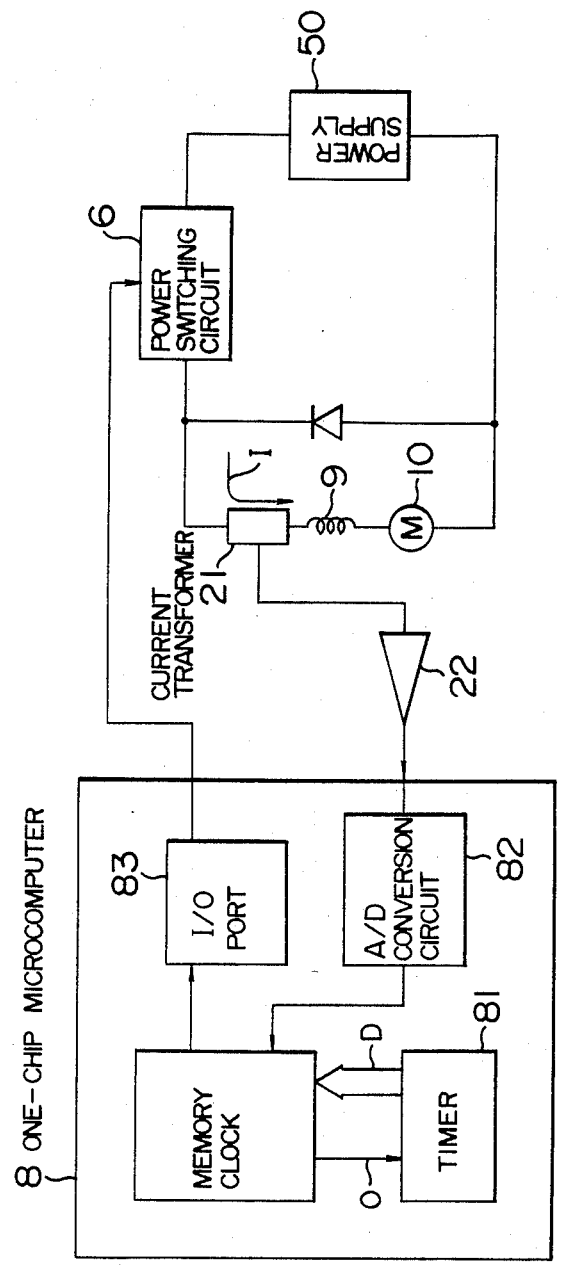
F I G. 5

ELECTRIC MOTOR CONTROL APPARATUS

BACKGROUND OF THE INVENTION

1. Field of the Invention

The present invention relates to a control apparatus for an electric motor driven by a load current modulated to a pulse form by a switching device, in which an average value of the load current is made to follow a command value.

2. Description of the Related Art

In order to control the operation of a DC electric motor by modulating a motor current flowing in the motor, that is, a load current to a pulse form, and by varying a pulse width so that an average value of the load current follows a command value, the detection of the average value of the load current is required. However, in such a control, since the load current pulsates, it is a problem how to detect the average value of the load current in a control period. In one of prior art methods for detecting the average value of the load current, a value of the load current when a switching device applying a voltage to the motor is changed to an "on" or "off" state is detected, and using this value as an initial value, the average value of the load current is estimated on the basis of a variation characteristic of the load current determined by a power supply voltage, motor constants, and a switching period (e.g., Japanese Patent Laid-Open Publication No. 58-58893 (1983)).

However, the aforementioned method poses a problem in that since a range of the estimated values is generally large, a detection error of the average value becomes large. In particular, when the load is not applied to the electric motor, the error becomes large. Furthermore, there is another problem in that in order to perform the estimation calculation, a burden on a CPU is heavy, and at the same time, when the calculation time is long, the motor control in a short period becomes impossible.

SUMMARY OF THE INVENTION

An object of the present invention is to provide an electric motor control apparatus where in the timing at which a varying load current becomes an average value is determined, and according to this timing, a value of the load current is directly detected as its average value thereby to obtain the average value of the load current with a small estimation error and with high precision, and at the same time, the control with a short period is enabled by increasing the detection speed and by eliminating an estimation calculation.

According to the present invention, in an electric motor control apparatus wherein a load current modulated in a pulse form and flowing in an electric motor is detected, and the load current is controlled by varying a pulse width of the load current so that an average value of the load current follows a command value, the control apparatus is comprised of a switching device for modulating a direct current supplied to the electric motor from a DC power supply in said pulse form, a current detector for detecting the load current flowing in the electric motor, and a control device including an average load current detecting means for detecting the load current as the average value by inputting from the current detector the load current at a time point after the switching device is made conductive and after the lapse of a predetermined time which varies in accordance with an "on" time of the switching device, an "on" time calculating means for determining the "on" time of the switching device in the next period in accordance with the average value of the load current detected by the average load current detecting means, and a switching control section for on-off controlling the switching device in accordance with a commanded period and the "on" time calculated by the "on" time calculating means.

In the apparatus according to the present invention, the average value of the load current is obtained directly by the average load current detecting means. In other words, the load current at the time point after the lapse of a constant time from the turning on of the switching device is directly detected to make it as the average value of the load current. This constant time is determined to be a time period in which the load current assumes the average current, by using an increase curve of current determined beforehand considering circuit constants including a power supply voltage, temperature, reactance of a motor coil, and resistance. Since the average current changes depending on a conduction time ("on" time) of the switching device, the timing for detecting the current varies according to the "on" time. Therefore, when the "on" time is given, the current is detected according to the timing determined by this "on" time.

The "on" time calculating means determines an "on" time of the switching device in the next period in relation to the average load current detected by the average load current detecting means so that the average load current becomes a target value.

The switching control means actually performs the on-off control of the switching device based on the "on" time calculated by the "on" time calculating means and a commanded control period.

The switching device may be a chopper circuit using a thyristor, a switching circuit using a transistor, or the like. The control unit may be constituted by a computer device, digital circuit, analog circuit, or the like.

BRIEF DESCRIPTION OF THE DRAWINGS

FIG. 5 is a block diagram showing an arrangement of an electric motor control apparatus in accordance with another concrete embodiment;

DESCRIPTION OF THE PREFERRED EMBODIMENTS

Hereinafter, concrete embodiments of the present invention will be described with reference to the attached drawings.

Figure 1:
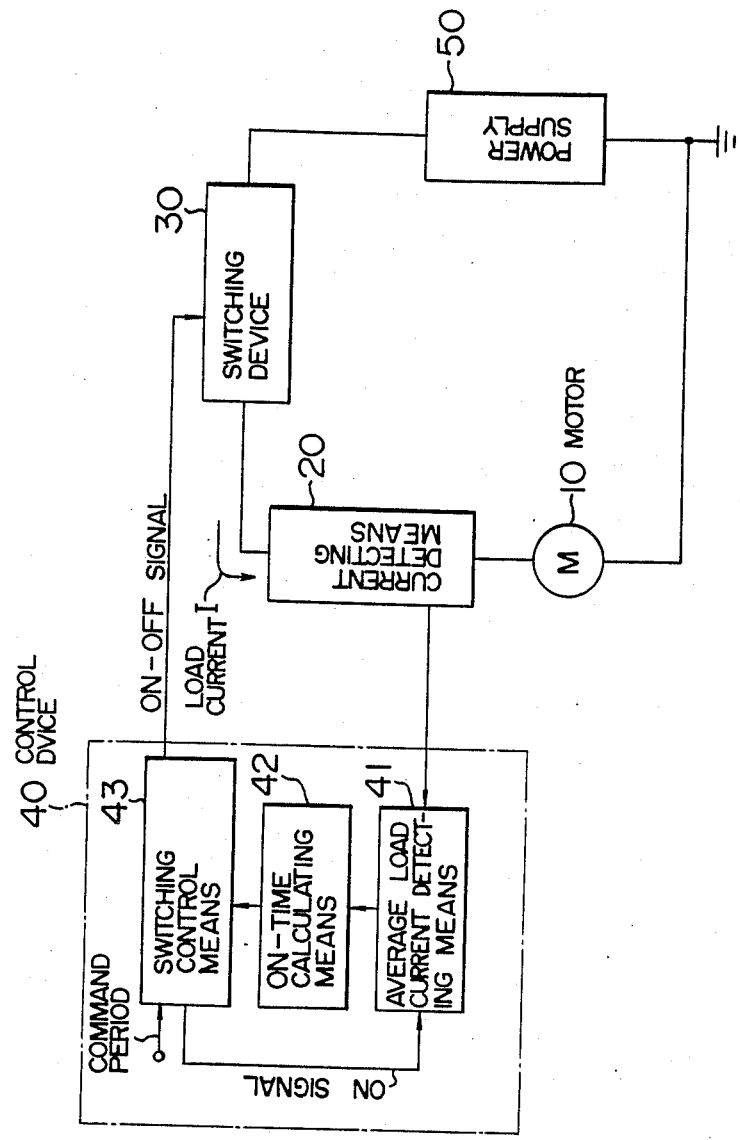
FIG. 1 is a block diagram showing conceptually a basic arrangement in accordance with the present invention.

First a basic arrangement is described according to FIG. 1. As shown in FIG. 1, basically, in an electric motor control apparatus wherein a load current I modulated in a pulse form flowing in an electric motor 10 is detected, and the load current is controlled by varying a pulse width of the load current so that an average value of the load current I follows a command value, the control apparatus is comprised of a switching device 30 for modulating a direct current supplied to the electric motor 10 from a DC power supply 50 to form the load current, a current detector 20 for detecting the load current flowing in the electric motor 10, and a control device 40 including an average load current detecting means 41 for detecting the load current as the average value by inputting from the current detector 20 the load current at a time point after the switching device 30 is made conductive and after the lapse of a predetermined time which varies in accordance with an "on" time of the switching device 30, an "on" time calculating means 42 for determining the "on" time of the switching device 30 in the next period in accordance with the average value of the load current detected by the average load current detecting means 41, and a switching control means 43 for on-off controlling the switching device 30 in accordance with a commanded period and the "on" time calculated by the "on" time calculating means 42.

Figure 2:
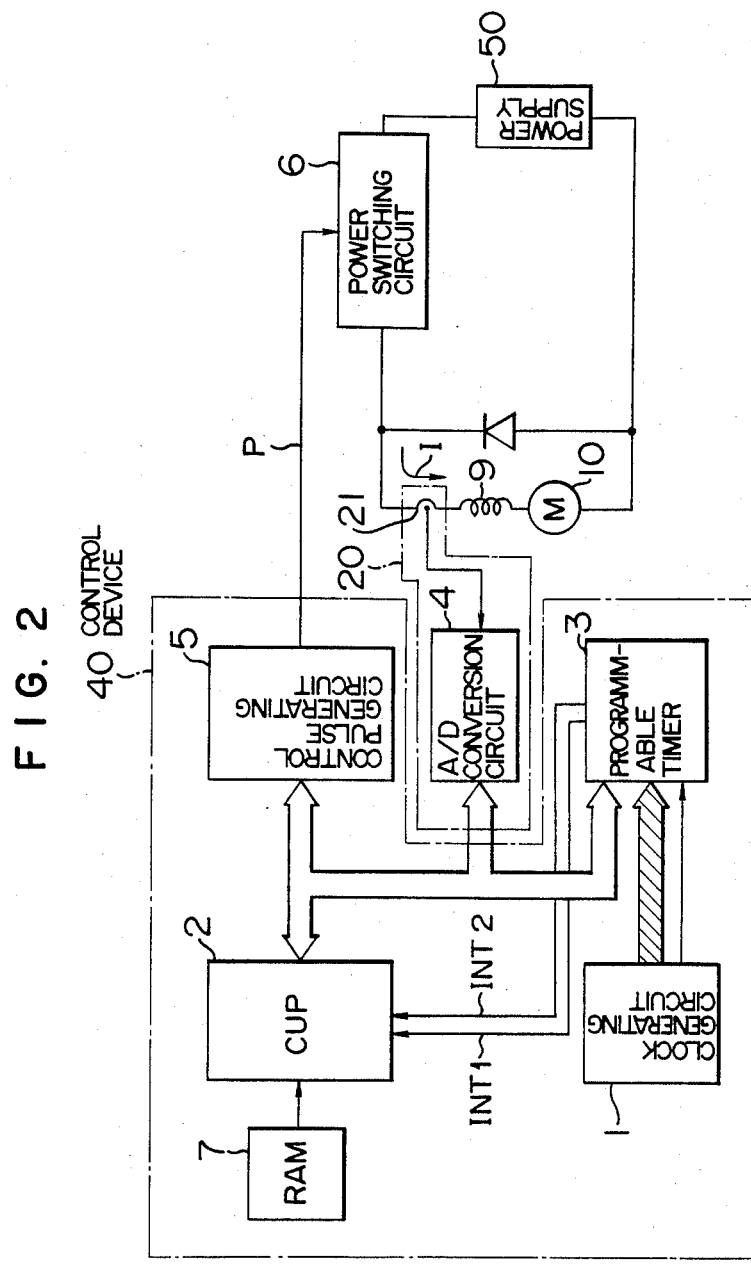
FIG. 2 is a block diagram showing an arrangement of an electric motor control apparatus in accordance with a concrete embodiment of the present invention.

FIG. 2 is a block diagram showing an arrangement of an electric motor control apparatus. In FIG. 2, reference numeral 1 designates a clock generating circuit for generating clock pulses for counting a time within a control period $T_o$, numeral 2 designates a CPU for detecting an average value I of a load current and for determining a control pulse width $\alpha$ by executing various control calculations for driving an electric motor, numeral 3 designates a programmable timer having at least two timers, one for generating an interrupt signal (INT1) for the CPU at each control period and the other for generating a further interrupt signal (INT2) at a time point at which average value reading timing data and counter data of the clocks are coincident, numeral 4 designates an A/D conversion circuit for detecting the load current I flowing in the electric motor as a digital value, numeral 5 designates a control pulse generating circuit for generating a control pulse in accordance with the pulse width $\alpha$ obtained by the CPU executing the various control calculations, numeral 6 designates a power switching circuit turned on and off in accordance with the output of the control pulse generating circuit 5, numeral 50 designates a DC power supply for driving the electric motor, numeral 10 designates the DC electric motor which is the object of the control, and numeral 9 designates an inductance contained in an electric motor circuit.

The control device 40 is composed of the CPU 2, clock pulse generating circuit 1, programmable timer 3, control pulse generating circuit 5, and a RAM storing a predetermined processing procedure and data. Further, a current detector 20 is composed of a current transformer 21 disposed on a line between the power switching circuit 6 and the inductance 9, and the A/D conversion circuit 4 for converting an analog signal indicative of the current I detected by the current transformer 21 into a digital signal. The CPU 2 has a function of executing a digital processing by software in accordance with a predetermined control program for the electric motor 10, and executing an I/O processing. The power switching circuit 6 is a chopper circuit including a thyristor and controls an electric motor current supplied to the DC electric motor 10 from the DC power supply 50, that is, controls the load current I.

Figure 3:
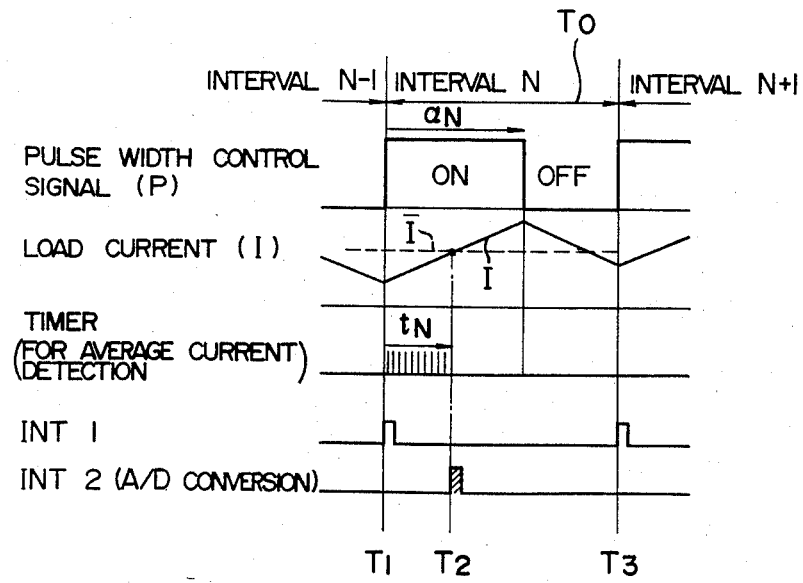
FIG. 3 is a timing chart for explaining the operation of the apparatus in the embodiment.
Figure 4:
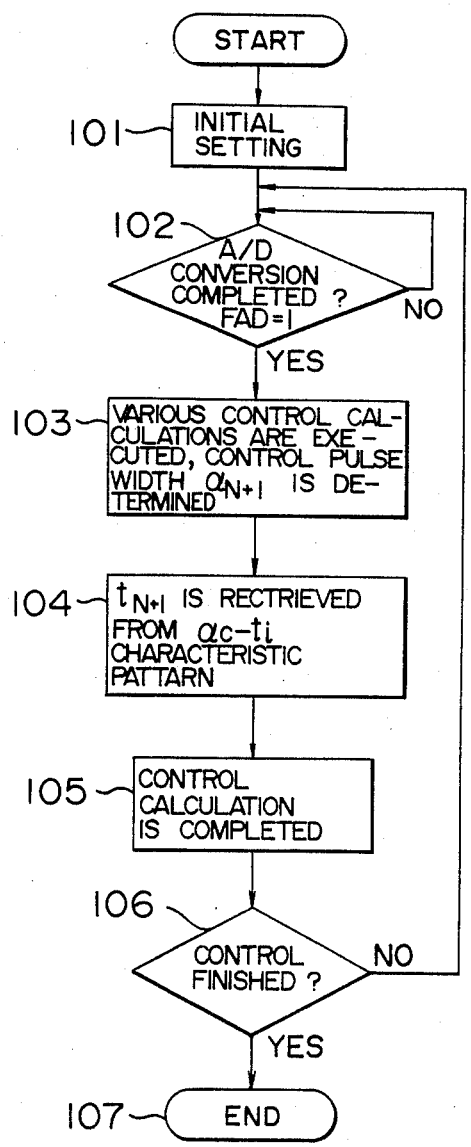
FIG. 4(a–c) is a flow chart showing a processing operation of a computer used in the apparatus in the embodiment.
Figure 4:
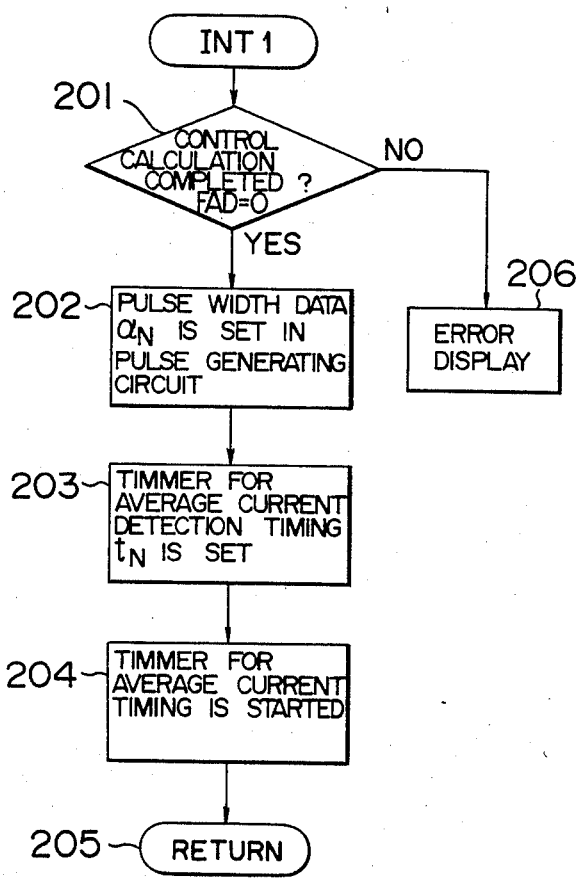
Figure 4:
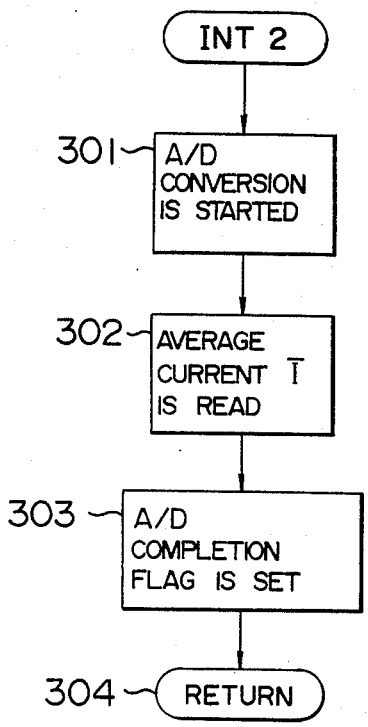

FIG. 3 includes a waveform diagram of respective signals indicated at various points in FIG. 2 and a timing chart therefore to explain the operation of the control apparatus. FIG. 4 is a flow chart of a program for detecting an average current $\bar{I}$ in accordance with an average current detecting timing obtained by the control calculation within the control period $T_o$, and for processing the control of the electric motor 10.

In the control device 40, the clock generating circuit 1 generates a reference clock pulse required to time count the control period $T_o$. The programmable timer 3 counts the clock pulses within the control period $T_o$, and at the time point at which a time data value set by the CPU 2 and a time count value are coincident generates the control period interrupt signal INT 1 and an A/D conversion timing interrupt signal INT 2 for the CPU 2. The CPU 2 has the function to execute the control calculation required to drive the electric motor 10, and in response to the interruption by the interrupt signal INT 2, reads through the current transformer 21 and the A/D conversion circuit 4 the average current $\bar{I}$ of the current I flowing in the electric motor 10, and determines the control pulse width $\alpha$ by performing the calculation for the control of the electric motor 10, and outputs a control signal to the control pulse generating circuit 5. The control pulse generating circuit 5 generates a pulse signal P of the pulse width $\alpha$, and controls the electric motor 10 in a pulse width modulation fashion by driving the power switching circuit 6 by the pulse signal P.

The operation will be described hereinafter with reference to the timing chart in FIG. 3 and flow charts in FIG. 4 at (a), (b), and (c). The description will be made, in particular, focussing on an interval N in FIG. 3, in which the programmable timer 3 counts each time the clock pulses are inputted from the clock generating circuit 1, and generates the interrupt signals INT 1 at times $T_1$ and $T_3$ at which a count value corresponding to the control period $T_o$ preset by the CPU 2 is reached. Here, in an interval N−1 just before the time $T_1$, various control calculations for driving the electric motor 10 are executed in accordance with a control program stored in the RAM 7 beforehand, and a control pulse width $\alpha_N$ for the next interval N is determined, and further, an average current timing $t_N$ has been obtained by looking up in a relationship pattern between a control pulse width $\alpha_i$ and an average current detecting timing $t_i$ stored in the RAM 7 beforehand. In response to the interruption at the time $T_1$ by the interrupt signal INT 1, an interruption processing in FIG. 4, at (b) is executed. In other words, the average current detecting timing data $t_N$ is set in the timer 3, and at the same time, the pulse width data $\alpha_N$ is set in the control pulse generating circuit 5, and the timer 3 for the average current detecting timing is started. With the progress in counting in the timer 3, at a time $T_2$ at which the average current detecting timing $T_N$ is reached, the interrupt signal INT 2 is generated, and the CPU 2 executes an interruption processing in FIG. 4, at (c). That is, the A/D conversion circuit 4 is actuated, and a current I corresponding to the average current $\bar{I}$ in the interval N is read. Between the time $T_2$ at which the reading utilizing the A/D conversion circuit 4 is completed and the time $T_3$, a main program shown in FIG. 4, at (a) is executed, and similarly to the processing executed in the interval N−1, a control pulse width $\alpha_{N+1}$ for the interval N+1 and an average current timing $T_{N+1}$ are determined after various control calculations for the drive of the electric motor 10.

Next, the operation in the interval N will be described with reference to the flow chart in FIG. 4. When a control period pulse (INT 1) at the time $T_1$ is inputted, the execution of the control period interruption routine shown in FIG. 4, at (b) is started. In step 201, it is ascertained whether the control calculation for the interval N has been completed in the interval N−1 just preceeding by one interval, and when not completed, proceeds to step 206 due to a timing error and displays the error. When completed, proceeds to step 202, and sets the pulse width data $\alpha_N$ in the control pulse generating circuit 5. Next, in step 203, the average current detecting timing data $t_N$ in the interval N is set in the input of the programmable timer 3, and at the same time, the timer 3 is started in step 204, and this routine is finished in the next step 205 and returns.

When the count of the timer 3 is up, and a set time $t_N$ of the timer 3 is reached, the interrupt signal INT 2 is generated at the time $T_2$, and a current detection interruption routine shown in FIG. 4, at (c) is executed, and in step 301, the A/D converter 4 is actuated. In step 302, the average current $\bar{I}$ in the interval N is directly read from the load current I, and in step 303, an A/D completion flag is set, and in step 304 this routine is finished.

Next, the main routine in FIG. 4, at (a) will be described. When the power supply is turned on, first in step 101, an initial condition is set. In the initial condition, the A/D conversion completion (FAD=1) has been set. In the interval N, in step 102, the program awaits until the A/D conversion is completed, and when completed, proceeds to step 103. In step 103, various control calculations for the electric motor drive are executed based on control variables including the average current $\bar{I}$ in the interval N, etc., and the control pulse width $\alpha_{N+1}$ for the next interval N+1 is decided. In step 104, the average current detecting timing $t_{N+1}$ for the interval N+1 is retrieved from a characteristic pattern of the control pulse width $\alpha_i$ and the average current detecting timing $t_i$ prepared beforehand, and in step 105 a completion flag (FAD=0) of the control calculation processing is set, and proceeds to step 106. In step 106 it is decided whether the control is finished, and when finished, the main routine is finished in step 107. However, when the control is to be continued, the program proceeds to step 102, and the same processing is repeatedly executed until the control is finished. By executing the processing as described above, the power switching circuit 6 is controlled in the on-off fashion, and the electric motor 10 is driven so that the average value $\bar{I}$ of the load current follows the command value.

Further, the control period $T_o$ can be changed flexibly by only writing anew the data stored in the RAM, and the degree of freedom for design is extended. Moreover, if the control pulse width $\alpha_i$ and the average current timing $t_i$ which are arranged in the pattern form beforehand have been normalized in relation to a duty ratio $\alpha_i/T_o$, the correspondence can be established even in case of a variable control period ($T_o$ is varied). In the embodiment, although the detected current is one current, the control can be extended even to a case of an N-phase AC motor (N≧2) by executing the similar processing for N phases. In addition, a stable electric motor control can be achieved by performing the control with various α-t patterns made by taking into account the power supply voltage, temperature, etc., during the drive of the electric motor.

Figure 6:
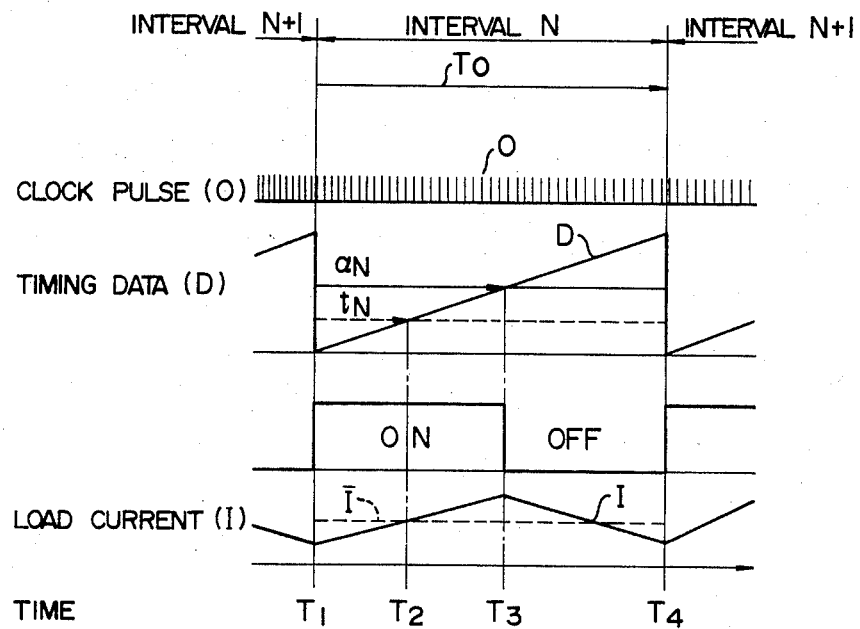
FIG. 6 is a timing chart for explaining the operation of the apparatus in accordance with another concrete embodiment.
Figure 7:
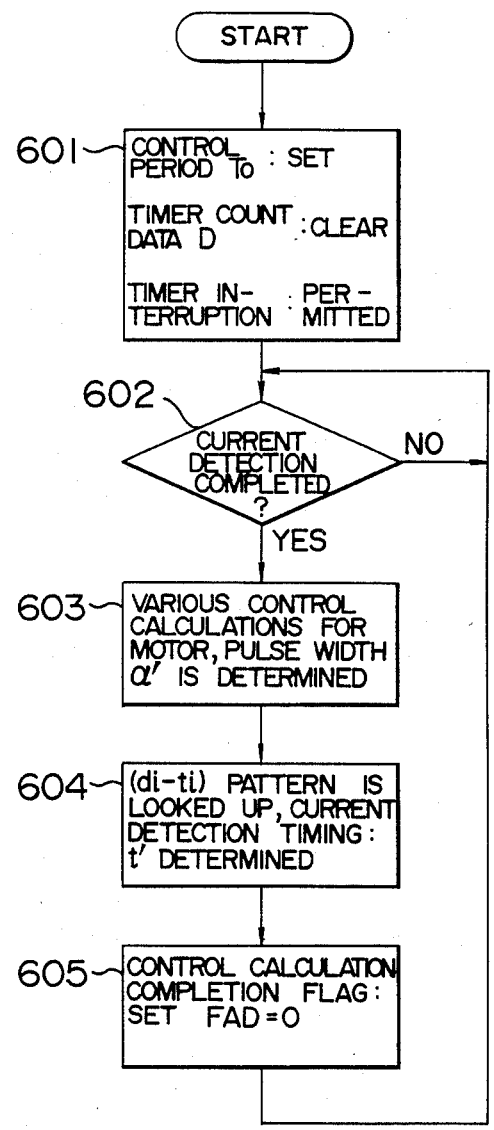
FIGS. 7 and 8 are flow charts showing processing operation of the apparatus.

Next, a second embodiment will be described. FIG. 5 is a block diagram showing an arrangement of an apparatus of the embodiment, FIG. 6 is a timing chart showing the operation of the apparatus, FIG. 7 is a flowchart of a main program, and FIG. 8 is a flowchart of a timer interrupt program.

Differences from the first embodiment reside in that a control pulse signal and current detecting timing are determined by a single timer 81, and an A/D conversion circuit 82 and I/O port 83 are included in one chip, that is, a one-chip microcomputer 8. Reference numeral 21 designates a current transformer which constitutes a current detector, numeral 22 designates a current detection amplifier, and numeral 6 designates a power switching circuit. The one-chip microcomputer 8 actuates the internal timer 81 each time a clock pulse is received, and causes a timer interrupt counter in FIG. 8 to count up by software, and makes it function as an interval timer which is cleared upon reaching the control period $T_o$.

Hereinafter, the operation of the apparatus will be described focussing on the interval N with reference to the timing chart in FIG. 6, the main routine in FIG. 7, and the timer interrupt routine in FIG. 8.

Figure 8:
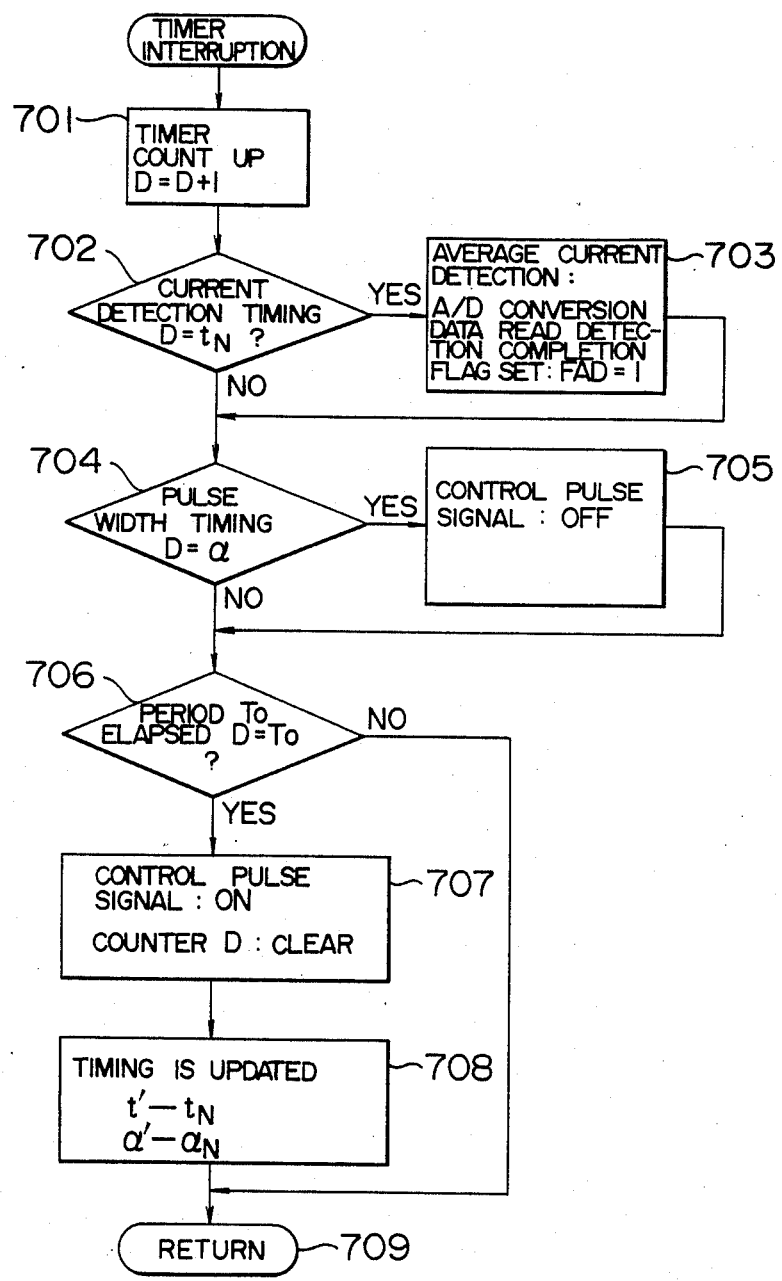

Each time a timer interrupt signal O generated by the internal clock is inputted, the timer interrupt routine of FIG. 8 is executed, and a count data D of the interval timer which counts the time of a preset control period $T_o$ is produced by software by allocating the data to a memory. In an internal N−1 before a time $T_1$ shown in FIG. 6, a control pulse width $\alpha_N$ and average current detecting timing $t_N$ have been determined. After the time $T_1$, each time the timer interrupt enters, the timer interrupt routine is started. In step 701, the count of the timer is increased by +1. In step 702, it is decided whether the timer data D has reached the current detection timing $t_N$, and when not reached, proceeds to step 704, and when reached, in step 703 a level of the average current $\bar{I}$ is A/D converted to read the level directly from the load current I, and after the detection completion flag (FAD=1) is set, proceeds to step 704. In step 704, when the control pulse width timing $\alpha_N$ has not been reached, the program proceeds to step 706, whereas it has been reached, in step 705 the control pulse signal is turned off, and proceeds to step 706. In step 706, it is decided whether the control period $T_o$ (in the interval N, it corresponds to the time $T_1$) has been reached, and when not reached, the program proceeds to step 709, whereas when reached, in step 707 the control pulse signal is turned on and the timer counter data D is cleared, and makes it the interval timer. In step 708 the control pulse width data $\alpha'$ and the current detection timing data $t'$ for the interval N which have been obtained in the main routine in the interval N−1 prior to the time $T_1$ are updated respectively to $t_N$ and $\alpha_N$, and proceeds to step 709. In step 709, the timer interrupt processing for one time is finished.

Next, the main routine of FIG. 7 will be described. Upon turning on the power supply, an initial processing in step 601 in the main routine is executed. That is, the control period $T_o$ is set on the memory, the timer counter data is cleared, and the timer interrupt is made to be a permission mode. In step 602, it is decided whether the average current detection has been completed and whether the time $T_2$ has passed in the interval N, and when not completed, returns to step 602 and awaits, where when completed, proceeds to step 603 and various control calculations required for the electric motor in the interval N+1 are executed to determine the control pulse width $\alpha'$. In step 604, the average current detection timing $t'$ corresponding to the pulse width $\alpha'$ is retrieved and determined from a $\alpha_i$-$t_i$ pattern prepared beforehand. In step 605, the motor control calculation completion flag (FAD=0) is set, and proceeds to step 602 and awaits until the current detection in the next interval N+1 is completed.

As described in the foregoing, according to the second embodiment, in terms of hardware, the electric motor control can be achieved with a most simple arrangement by a single one-chip microcomputer excepting the current detection amplifier.

As described above, in the present invention, an advantage resides in that the load current of the electric motor 10 is pulse-width controlled by detecting directly the average load current at a predetermined time point within the control period by merely inputting the load current I without executing a correction calculation to detect the average load current $\bar{I}$. Furthermore, another advantage resides in that more stable electric motor control is enabled by preparing on the memory beforehand various patterns (control pattern pulse width $\alpha$-average current detection timing t) taking into consideration the power supply voltage, temperature, etc., during the driving of the electric motor.

I claim:

1. An electric motor control apparatus in which a load current modulated in a pulse form and flowing in an electric motor is detected, and said load current is controlled by varying a pulse width of said load current so that an average value of said load current follows a command value, said electric motor control apparatus comprising:
    switching means for modulating a direct current supplied to said electric motor from a DC power supply in said pulse form;
    a current detector for detecting said load current flowing in said electric motor;
    an average load current detecting means for detecting the average value of said load current by inputting from said current detector the load current at a time point after said switching means is rendered conductive and after the lapse of a predetermined time which varies in accordance an "on" time of said switching means, and by assuming said inputted load current as the average value of said load current to be detected;
    an "on" time calculating means for determining the "on" time of said switching means in the next period based on the average value of said load current detected by said average load current detecting section and the command value; and
    a switching control means for on-off controlling said switching means in accordance with a commanded period and the "on" time calculated by said "on" time calculating means.

2. An apparatus according to claim 1 wherein said switching means is a chopper circuit including a thyristor.

3. An apparatus according to claim 1 wherein said current detector includes an A/D converter.

4. An apparatus according to claim 1 wherein said switching control means is a pulse generating circuit.

5. An apparatus according to claim 1 further comprising a timer for generating an interrupt signal at each control period, and a further timer for generating an interrupt signal for read timing of said average load current.

6. An apparatus according to claim 5 wherein said both timers are programmable.

7. An apparatus according to claim 5 wherein said both timers are formed into a single timer for generating the interrupt signal at each control period and for generating the interrupt signal for the read timing of the average load current.

8. An apparatus according to claim 1, wherein said average load current detecting means, said "on" time calculating means, said switching control means, said A/D converter, and said timers are formed in an one-chip microcomputer.

9. An apparatus according to claim 3, wherein said average load current detecting means, said "on" time calculating means, said switching control means, said A/D converter, and said timers are formed in an one-chip microcomputer.

10. An apparatus according to claim 5, wherein said average load current detecting means, said "on" time calculating means, said switching control means, said A/D converter, and said timers are formed in an one-chip microcomputer.

* * * * *